(12) United States Patent
Ratnakar Aravind (10) Patent No.: US 8,174,949 B2
(45) Date of Patent: May 8, 2012

(54) SYSTEMS AND METHODS FOR FORMAT EFFICIENT TIMING RECOVERY IN A READ CHANNEL

(75) Inventor: Nayak Ratnakar Aravind, Lancaster, PA (US)

(73) Assignee: LSI Corporation, Milpitas, CA (US)

(*) Notice: Subject to any disclaimer, the term of this patent is extended or adjusted under 35 U.S.C. 154(b) by 179 days.

(21) Appl. No.: 12/496,787

(22) Filed: Jul. 2, 2009

(65) Prior Publication Data

US 2011/0002211 A1 Jan. 6, 2011

(51) Int. Cl.
  *G11B 7/00* (2006.01)
(52) U.S. Cl. ........ 369/59.19; 369/44.34; 369/47.28; 369/47.35; 369/53.12; 369/53.17; 369/53.35; 369/53.45; 369/59.22; 369/59.23
(58) Field of Classification Search .......... 369/59.19, 369/44.34, 47.28, 47.35, 53.12, 59.22, 59.23, 369/53.34, 53.35, 53.17
See application file for complete search history.

(56) References Cited

U.S. PATENT DOCUMENTS

| | | |
|---|---|---|
| 3,973,182 A | 8/1976 | Kataoka |
| 3,973,183 A | 8/1976 | Kataoka |
| 4,024,571 A | 5/1977 | Dischert et al. |
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,668,679 A | 9/1997 | Swearingen et al. |
| 5,696,639 A | 12/1997 | Spurbeck et al. |
| 5,781,129 A | 7/1998 | Schwartz et al. |
| 5,798,885 A | 8/1998 | Saiki et al. |

(Continued)

FOREIGN PATENT DOCUMENTS

FR  2904168  1/2008

(Continued)

OTHER PUBLICATIONS

Annampedu, V. and Aziz, P.M., "Adaptive Algorithms for Asynchronous Detection of Coded Servo Signals Based on Interpolation", IEEE Trans. on Mag., vol. 41, No. 10, Oct. 2005.

(Continued)

*Primary Examiner* — Wayne Young
*Assistant Examiner* — Linh Nguyen
(74) *Attorney, Agent, or Firm* — Hamilton, DeSanctis & Cha (57) ABSTRACT

Various embodiments of the present invention provide systems, methods and media formats for processing user data derived from a storage medium. As an example, a system is described that includes a storage medium with a series of data. The series of data includes a servo data and a user data region. The user data region includes a first synchronization pattern and a second synchronization pattern located a distance from the first synchronization pattern. A storage buffer is provided that is operable to receive at least a portion of the series of data. A retiming circuit calculates an initial phase offset and frequency offset for a defined bit within the storage buffer using a first location of the first synchronization pattern and a second location of the second synchronization pattern. An error correction loop circuit re-samples the series of data from the storage buffer based at least in part on the initial phase offset and a frequency offset.

20 Claims, 6 Drawing Sheets

U.S. PATENT DOCUMENTS

| | | | |
|---|---|---|---|
| 5,835,295 | A | 11/1998 | Behrens |
| 5,844,920 | A | 12/1998 | Zook et al. |
| 5,852,524 | A | 12/1998 | Glover et al. |
| 5,986,830 | A | 11/1999 | Hein |
| 5,987,562 | A | 11/1999 | Glover |
| 6,009,549 | A | 12/1999 | Bliss et al. |
| 6,023,383 | A | 2/2000 | Glover et al. |
| 6,069,583 | A | 5/2000 | Silvestrin et al. |
| 6,081,397 | A | 6/2000 | Belser |
| 6,111,712 | A | 8/2000 | Vishakhadatta et al. |
| 6,208,478 | B1 | 3/2001 | Chiu et al. |
| 6,269,058 | B1 * | 7/2001 | Yamanoi et al. .......... 369/47.28 |
| 6,278,591 | B1 | 8/2001 | Chang et al. |
| 6,400,518 | B1 | 6/2002 | Bhaumik et al. |
| 6,404,829 | B1 | 6/2002 | Sonu |
| 6,441,661 | B1 | 8/2002 | Aoki et al. |
| 6,490,110 | B2 | 12/2002 | Reed et al. |
| 6,493,162 | B1 | 12/2002 | Fredrickson |
| 6,519,102 | B1 | 2/2003 | Smith |
| 6,530,060 | B1 | 3/2003 | Vis et al. |
| 6,603,622 | B1 | 8/2003 | Christiansen et al. |
| 6,606,048 | B1 | 8/2003 | Sutardja |
| 6,633,447 | B2 | 10/2003 | Franck et al. |
| 6,646,822 | B1 | 11/2003 | Tuttle et al. |
| 6,657,802 | B1 | 12/2003 | Ashley et al. |
| 6,775,529 | B1 | 8/2004 | Roo |
| 6,788,484 | B2 | 9/2004 | Honma |
| 6,813,108 | B2 | 11/2004 | Annampedu et al. |
| 6,816,328 | B2 | 11/2004 | Rae |
| 6,839,014 | B2 | 1/2005 | Uda |
| 6,856,183 | B2 | 2/2005 | Annampedu |
| 6,876,511 | B2 | 4/2005 | Koyanagi |
| 6,912,099 | B2 | 6/2005 | Annampedu et al. |
| 6,963,521 | B2 | 11/2005 | Hayashi |
| 6,999,257 | B2 | 2/2006 | Takeo |
| 6,999,264 | B2 | 2/2006 | Ehrlich |
| 7,002,767 | B2 | 2/2006 | Annampedu et al. |
| 7,038,875 | B2 | 5/2006 | Lou et al. |
| 7,072,137 | B2 | 7/2006 | Chiba |
| 7,082,005 | B2 | 7/2006 | Annampedu et al. |
| 7,092,462 | B2 | 8/2006 | Annampedu et al. |
| 7,116,504 | B1 | 10/2006 | Oberg |
| 7,126,776 | B1 | 10/2006 | Warren, Jr. et al. |
| 7,136,250 | B1 | 11/2006 | Wu et al. |
| 7,154,689 | B1 | 12/2006 | Shepherd et al. |
| 7,167,328 | B2 | 1/2007 | Annampedu et al. |
| 7,180,693 | B2 | 2/2007 | Anaampedu et al. |
| 7,187,739 | B2 | 3/2007 | Ma |
| 7,191,382 | B2 | 3/2007 | James et al. |
| 7,193,544 | B1 | 3/2007 | Fitelson et al. |
| 7,193,798 | B2 | 3/2007 | Byrd et al. |
| 7,193,936 | B2 * | 3/2007 | Oki .......................... 369/44.13 |
| 7,199,961 | B1 | 4/2007 | Wu et al. |
| 7,203,013 | B1 | 4/2007 | Han et al. |
| 7,206,146 | B2 | 4/2007 | Flynn et al. |
| 7,230,789 | B1 | 6/2007 | Brunnett et al. |
| 7,253,984 | B1 | 8/2007 | Patapoutian et al. |
| 7,301,717 | B1 | 11/2007 | Lee et al. |
| 7,308,057 | B1 | 12/2007 | Patapoutian |
| 7,362,536 | B1 | 4/2008 | Liu et al. |
| 7,375,918 | B1 | 5/2008 | Shepherd et al. |
| 7,411,531 | B2 | 8/2008 | Aziz et al. |
| 7,420,498 | B2 | 9/2008 | Barrenscheen |
| 7,423,827 | B2 | 9/2008 | Neville et al. |
| 7,446,690 | B2 | 11/2008 | Kao |
| 7,499,238 | B2 | 3/2009 | Annampedu |
| 7,620,101 | B1 | 11/2009 | Jenkins |
| 2002/0001151 | A1 | 1/2002 | Lake |
| 2002/0150179 | A1 | 10/2002 | Leis et al. |
| 2002/0176185 | A1 | 11/2002 | Fayeulle et al. |
| 2002/0181377 | A1 | 12/2002 | Nagata et al. |
| 2003/0090971 | A1 * | 5/2003 | Gushima et al. ............. 369/47.3 |
| 2003/0095350 | A1 | 5/2003 | Annampedu et al. |
| 2005/0046982 | A1 | 3/2005 | Liu et al. |
| 2005/0157415 | A1 | 7/2005 | Chiang |
| 2005/0243455 | A1 | 11/2005 | Annampedu |
| 2006/0285469 | A1 * | 12/2006 | Tonami ........................ 369/103 |
| 2007/0064847 | A1 | 3/2007 | Gaedke et al. |
| 2007/0071152 | A1 | 3/2007 | Chen et al. |
| 2007/0103805 | A1 | 5/2007 | Hayashi |
| 2007/0104300 | A1 | 5/2007 | Esumi et al. |
| 2007/0183073 | A1 | 8/2007 | Sutardja et al. |
| 2007/0230015 | A1 | 10/2007 | Yamashita et al. |
| 2007/0263311 | A1 | 11/2007 | Smith |
| 2008/0080082 | A1 | 4/2008 | Erden et al. |
| 2008/0212715 | A1 | 9/2008 | Chang |
| 2008/0266693 | A1 | 10/2008 | Bliss et al. |
| 2009/0002862 | A1 | 1/2009 | Park |
| 2009/0142620 | A1 | 6/2009 | Yamamoto et al. |

FOREIGN PATENT DOCUMENTS

| | | |
|---|---|---|
| WO | WO 2008/009620 | 1/2008 |

OTHER PUBLICATIONS

Aziz and Annampedu, "Asynchronous Maximum Likelihood (ML) Detection of Servo repeatable Run Out (RRO) Data".

Aziz & Annampedu, "Interpolation Based Maximum-Likelihood(ML) Detection of Asynchronous Servo Repeatable Run Out (RRO) Data", IEEE Int. Mag. Con., vol. 42, No. 10, Oct. 2006.

* cited by examiner

Fig. 7

SYSTEMS AND METHODS FOR FORMAT EFFICIENT TIMING RECOVERY IN A READ CHANNEL

BACKGROUND OF THE INVENTION

The present invention is related to storage media, and more particularly to systems and methods for synchronizing read operations.

A typical storage medium includes a number of storage locations where data may be stored. Data is written to the medium within areas designated for user data by positioning a read/write head assembly over the storage medium at a selected location, and subsequently passing a modulated electric current through the head assembly such that a corresponding magnetic flux pattern is induced in the storage medium. To retrieve the stored data, the head assembly is positioned over a track containing the desired information and advanced until it is over the desired data. The previously stored magnetic flux pattern operates to induce a current in the head assembly, and the induced current may then be converted to an electrical signal representing the originally recorded data.

User data regions on a storage medium are separated by wedges that include servo data. The servo data includes address and other location information. Once a desired location is identified, user data subsequent to the servo data may be read. The user data is not necessarily synchronized to the servo data, and as such a synchronizing pattern may be included within the user data region directly following the servo data. In a typical scenario, the synchronization pattern may include a very large number of bits to allow for accurate phase and frequency adjustment. Increasing the number of bits dedicated to the synchronization pattern increases the accuracy of the phase and frequency adjustment, and therefore the accuracy of the data read from the storage medium. However, increasing the number of bits dedicated to the synchronization pattern also reduces the amount of actual user data that may be stored in the user data region.

Hence, for at least the aforementioned reasons, there exists a need in the art for advanced systems and methods for increasing the accuracy of read operations and/or increasing the format efficiency of the user data region.

BRIEF SUMMARY OF THE INVENTION

The present invention is related to storage media, and more particularly to systems and methods for synchronizing read operations.

Various embodiments of the present invention provide bit density efficient systems for accurately processing user data derived from a storage medium. The systems include a storage medium with a series of data. The series of data includes a servo data and a user data region. The user data region includes a first synchronization pattern and a second synchronization pattern located a distance from the first synchronization pattern. A storage buffer is provided that is operable to receive at least a portion of the series of data. A retiming circuit calculates an initial phase offset and frequency offset for a defined bit within the storage buffer using a first location of the first synchronization pattern and a second location of the second synchronization pattern. An error correction loop circuit re-samples the series of data from the storage buffer based at least in part on the initial phase offset and a frequency offset.

In some instances of the aforementioned embodiments, the retiming circuit includes a first location calculation circuit that is operable to determine a first location corresponding to the first synchronization pattern, and a second location calculation circuit that is operable to determine a second location corresponding to the second synchronization pattern. In addition, the retiming circuit includes a frequency offset calculation circuit that is operable to calculate a frequency offset based at least in part on the first location and the second location, and an initial phase offset circuit that is operable to calculate an initial phase offset based at least in part on the frequency offset. In some cases, the first location calculation circuit includes a synchronization detector circuit is operable to detect the first synchronization pattern, and a location calculation circuit that calculates a location of where the first synchronization pattern was detected by the synchronization detector circuit. In particular cases, the first location calculation circuit further includes a T/2 interpolation circuit that provides at least an additional point from which the location of where the first synchronization pattern was detected can be found. In such cases, the location of where the first synchronization pattern was detected is within one quarter sampling period of the actual location of the first synchronization pattern. In various instances of the aforementioned embodiments, the retiming circuit includes a window signal circuit that is operable to identify a first window during which the first synchronization pattern is expected within the series of data, and to identify a second window during which the second synchronization pattern is expected within the series of data.

In some instances of the aforementioned embodiments, the error correction loop circuit includes a digital phase lock loop circuit that receives the initial phase offset and the frequency offset, and provides a bit period by bit period updated phase shift output; and an interpolator circuit that interpolates the series of data accessed from the storage buffer. In some such cases, the series of data accessed from the storage buffer is multiplied by a gain correction factor prior to being interpolated by the interpolator circuit. In various such cases, the error correction loop circuit further includes a data detector circuit that applies a detection algorithm to an output derived from the interpolator circuit to yield a data output. The bit period by bit period updated phase shift output provided by the digital phase lock loop circuit is based at least in part on the data output.

Other embodiments of the present invention provide methods for processing user data derived from a storage medium. Such methods include providing a storage medium including a series of data. The series of data includes a servo data and a user data region, with the user data region includes a first synchronization pattern and a second synchronization pattern located a distance from the first synchronization pattern. The methods further include sampling data from the storage medium and storing the resulting series of data samples to a storage buffer; determining a first location of the first synchronization pattern; determining a second location of the second synchronization pattern; calculating a frequency offset and an initial phase offset based at least in part on the first location and the second location; and interpolating at least a portion of the series of data from the storage buffer based at least in part on the frequency offset and the initial phase offset.

In some instances of the aforementioned embodiments, determining the first location of the first synchronization pattern includes: detecting the first synchronization pattern in the series of data and asserting a first synchronization pattern found signal; and determining a number of bit periods from a defined point until assertion of the first synchronization pattern found signal. In some such instances, the data is sampled at a period T to yield T samples, and determining the first location of the first synchronization pattern further includes: interpolating the series of data using a T/2 interpolator circuit to yield T/2 samples; determining which of a T sample or T/2 sample exhibits a maximum within a first synchronization pattern window; and assigning a location of the determined T sample or T/2 sample as the first location.

Yet other embodiments of the present invention provide storage systems that include a storage medium, a read/write head assembly, and a read channel circuit. The storage medium includes a series of data with a servo data and a user data region. The user data region includes a first synchronization pattern and a second synchronization pattern located a distance from the first synchronization pattern. The read/write head assembly disposed in relation to the storage medium. The read channel circuit is operable to receive an analog input derived from the read/write head assembly that corresponds to the series of data, and includes a storage buffer that is operable to receive at least a portion of the series of data, a retiming circuit that is operable to calculate an initial phase and frequency offset for a defined bit within the storage buffer using a first location of the first synchronization pattern and a second location of the second synchronization pattern; and an error correction loop circuit that re-samples the series of data from the storage buffer based at least in part on the initial phase offset and a frequency offset.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to storage media, and more particularly to systems and methods for synchronizing read operations.

Various embodiments of the present invention utilize a data format including two synchronization patterns spaced a defined distance apart in a user data region. A sampling clock is used to sample input data. The first synchronization pattern is processed to determine its location, and a phase offset between the sample clock and the first synchronization pattern. An interim portion of user data subsequent to the first synchronization pattern is sampled using the sampling clock, and the resulting samples are stored to a memory. The interim portion of user data is of defined length and is followed by the second synchronous pattern. Similar to the first synchronous pattern, the second synchronous pattern is processed to determine its location. The location of the first synchronous pattern is subtracted from the location of the second synchronous pattern, and the difference is divided by the length of the intervening user data to yield a frequency offset. This frequency offset is combined with the phase offset corresponding to the first synchronous pattern to yield a phase offset for the initial data samples stored in the memory. The phase offset and frequency offset are provided as initial values to an error correction loop that interpolates the stored samples. By providing a more accurate initial phase offset and frequency offset, the ability of the error correction loop to properly interpolate the data stored in the memory is greatly enhanced.

It should be noted that while some of the discussion provided herein refers to a single user data field disposed between two consecutive servo data patterns, that it is possible to process multiple re-synchronized, user data sections disposed between two consecutive servo data patterns. Where a single user data pattern is disposed between consecutive servo patterns, the servo pattern may operate as a signal to begin processing. Alternatively, where multiple user data patterns are placed between servo data patterns, a signal indicating completion of a user data pattern may be used to signal the start of processing. One such signal may be a read gate signal found on some hard disk drives that toggles between the processing of consecutive user data patterns. Based upon the disclosure provided herein, one of ordinary skill in the art will recognize a variety of signals that may be used to signal transitions between user data patterns.

Figure 1A:
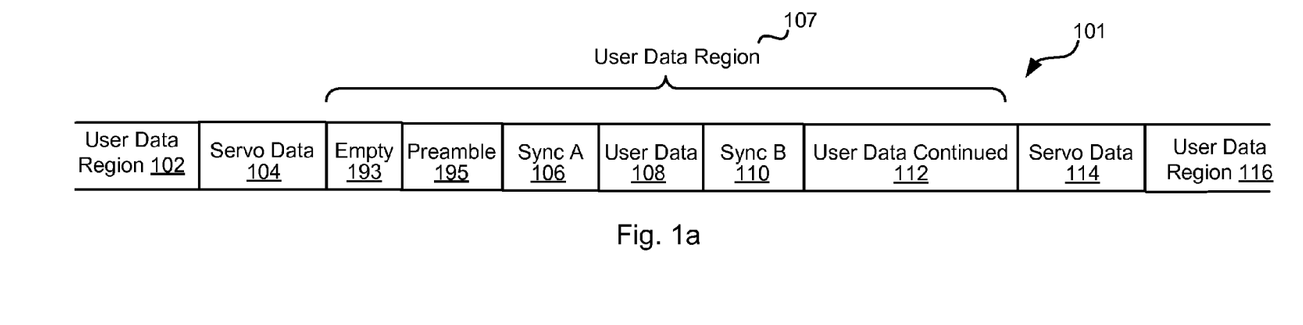
FIG. 1a depicts a region format in accordance with one or more embodiments of the present invention suitable for enhanced synchronization with relatively long user data regions disposed between servo data regions.

Turning to FIG. 1a, a region format 101 suitable for enhanced synchronization with relatively long user data regions disposed between servo data regions is shown in accordance with one or more embodiments of the present invention. Region format 101 includes a user data region 102 followed by a servo data 104. Servo data 104 may be any servo data pattern known in the art. As an example, servo data 104 may include, but is not limited to, a preamble pattern, a sector address mark, a gray code and a burst. As another example, servo data 104 may include a preamble, a first sector address mark, a gray code, a first burst, a second sector address mark and a second burst. Such a servo data pattern is discussed in PCT Patent Application PCT/US08/78047 entitled "Systems and Methods for Improved Servo Data Operation", and filed Sep. 29, 2008 by Ratnakar Aravind. The entirety of the aforementioned application is incorporated herein by reference for all purposes. Based upon the disclosure provided herein, one of ordinary skill in the art will recognize a variety of servo data patterns that may be utilized in accordance with different embodiments of the present invention.

Servo data 104 is followed a user data region 107. User data region 107 begins with an unused empty space 193. Unused empty space 193 is typically very short, and is designed to allow for a mismatch in the clock used to write servo data 104 and that used to write user data region 107. In some cases, empty space 193 is less than one bit period in length, while in other cases it is a few bit periods in length. Following empty space 193, a preamble pattern 195 is written. Preamble pattern 195 may be used to indicate that the beginning of user data region 107 has been detected and to begin the process of synchronizing to a sampling clock for user data region 107. Preamble pattern 195 is followed by a first synchronization pattern 106 (Sync A) written in a user data region 107. Synchronization pattern 106 includes a small number of bit periods over which a short pattern is written. In some embodiments of the present invention, synchronization pattern 106 is between ten (10) and fifty (50) bit periods in length. By keeping the length of synchronization pattern 106 short, it not only reduces overhead written in user data region 107, but also renders synchronization pattern 106 substantially immune from the effects of any uncorrected frequency offset.

A portion of user data 108 is written after synchronization pattern 106 in user data region 107. User data 108 is followed by a second synchronization pattern 110 (Sync B). Synchronization pattern 110 is similar to synchronization pattern 106 in that it includes an identifiable pattern spread over a limited number of bit periods. In some cases, synchronization pattern 110 is identical to synchronization pattern 106. In other cases, synchronization pattern 110 includes a different pattern and/or a different length than synchronization pattern 108. The distance between synchronization pattern 106 and synchronization pattern 110 (i.e., the number of bit periods devoted to user data 108) is known. To increase the accuracy of the frequency offset estimates, the distance between synchronization pattern 106 and synchronization pattern 110 is chosen to be relatively large. However, as more fully described below in relation to FIG. 2, the distance between synchronization pattern 106 and synchronization pattern 110 corresponds to the size of a memory buffer used in performing processing of the user data. Thus, the distance is chosen as a tradeoff between increased accuracy and limiting the size of memory used in processing. In one particular embodiment of the present invention, the distance is chosen between five hundred (500) and two thousand, five hundred (2500) bit periods in length. Based upon the disclosure provided herein, one of ordinary skill in the art will recognize a variety of distances (i.e., amounts of user data 108) between synchronization data 106 and synchronization data 110 depending upon particular design constraints. Following synchronization data 110, user data 108 is continued in a user data region 112 as part of user data region 107. A subsequent servo data 114 follows user data region 107 and the dual synchronization pattern interspersed in user data is followed in user data region 116. In one embodiment of the present invention, a relatively long user data region is one that is greater than two thousand, five hundred bit periods in length.

In use, a data processing system receives a series of samples corresponding to user data region 107. From these samples, the location of synchronization pattern 106 is identified along with any phase offset exhibited in the location. The data processing system continues to receive samples of user data 108 until an expected time later when samples of synchronization pattern 110 are received. The samples of synchronization pattern 110 are used to identify the location of synchronization pattern 110. The identified locations of synchronization patterns 106, 110 are compared to determine a phase offset and a frequency offset between the sampling clock and the actual bit periods represented in synchronization pattern 106 and synchronization pattern 110. The frequency offset and phase offset may be used to calculate the phase and frequency offset exhibited for the initial bit periods of user data region 107. The calculated initial frequency offset and phase offset may be provided to an error correction loop including a digital phase lock loop circuit that provides resampling (e.g., interpolating) the data from user data region 107.

Figure 1B:
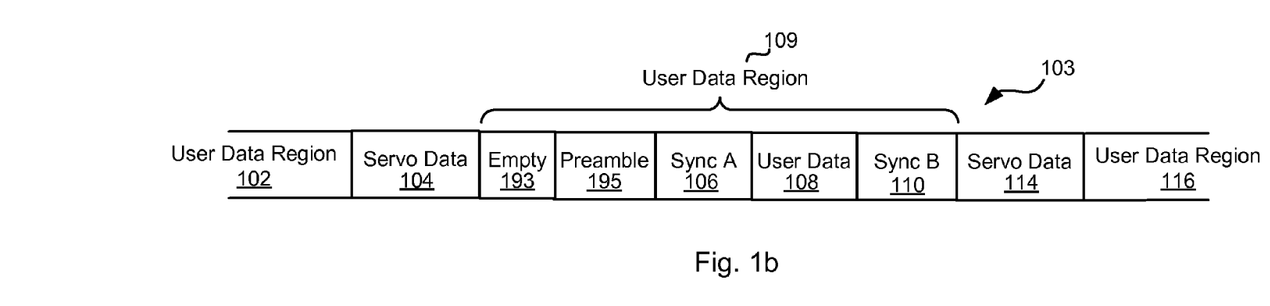
FIG. 1b depicts a region format in accordance with various embodiments of the present invention suitable for enhanced synchronization with medium length user data regions disposed between servo data regions.

Turning to FIG. 1b, a region format 103 suitable for enhanced synchronization with medium length user data regions disposed between servo data regions is shown in accordance with various embodiments of the present invention. Region format 103 includes user data region 102 followed by servo data 104. Servo data 104 is followed by a user data region 109. User data region 109 begins with an unused empty space 193. Following empty space 193, preamble pattern 195 is written. Preamble pattern 195 is followed by first synchronization pattern 106 (Sync A) written in user data region 109. User data 108 is written after synchronization pattern 106 in user data region 109. User data 108 is followed by synchronization pattern 110 (Sync B). In this case, because only a relatively small amount of user data is to be written in user data region 109, synchronization pattern 110 is written at the end of user data region 109 and followed thereafter by subsequent servo data 114. The distance between synchronization pattern 106 and synchronization pattern 110 corresponds to the total amount of data stored in user data 108. Subsequent servo data 114 follows user data region 109 and the dual synchronization pattern interspersed in user data is followed in user data region 116. In one embodiment of the present invention, a medium length user data region is between five-hundred (500) bit periods in length and two thousand, five hundred (2500) bit periods in length.

In use, a data processing system receives a series of samples corresponding to preamble synchronization pattern 106. From these samples, the location of synchronization pattern 106 is identified along with any phase offset exhibited in the location. The data processing system continues to receive samples of user data 108 until an expected time later when samples of synchronization pattern 110 are received. The samples of synchronization pattern 110 are used to identify the location of synchronization pattern 110. The identified locations of synchronization patterns 106, 110 are compared to determine a phase offset and a frequency offset between the sampling clock and the actual bit periods represented in synchronization pattern 106 and synchronization pattern 110. The frequency offset and phase offset may be used to calculate the phase and frequency offset exhibited for the initial bit periods of user data region 109. The calculated initial frequency offset and phase offset may be provided to an error correction loop including a digital phase lock loop circuit that provides re-sampling (e.g., interpolating) the data from user data region 109.

Figure 1C:
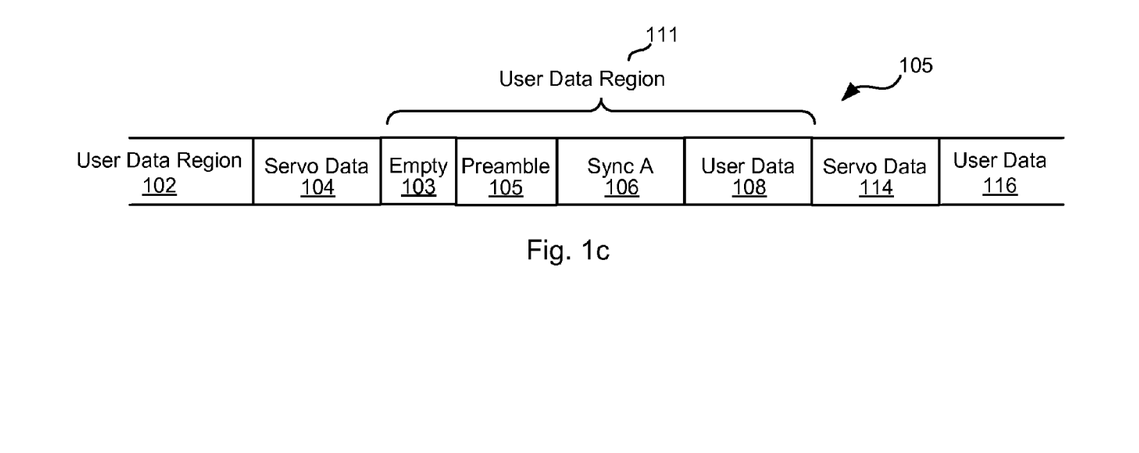
FIG. 1c depicts a region format in accordance with some embodiments of the present invention suitable for enhanced synchronization with relatively short user data regions disposed between servo data regions.

Turning to FIG. 1c, a region format 105 suitable for enhanced synchronization relatively short user data regions disposed between servo data regions is shown in accordance with various embodiments of the present invention. Region format 105 includes user data region 102 followed by servo data 104. Servo data 104 is followed by a user data region 111. User data region 109 begins with an unused empty space 193. Following empty space 193, preamble pattern 195 is written. Preamble pattern 195 is followed by first synchronization pattern 106 (Sync A) written in a user data region 109. In this case, the overall length of user data region 111 is so short that use of two synchronization patterns would result in an unacceptable level of overhead and/or the distance between the two synchronization patterns would be so close together that they would not provide a high degree of accuracy. In such a case, only a single synchronization pattern is used followed by user data 108. User data 108 is followed by subsequent servo data 114 and the synchronization pattern interspersed in user data region 116. In one embodiment of the present invention, a relatively short user data region is one that is less than five hundred (500) bit periods in length.

Figure 2:
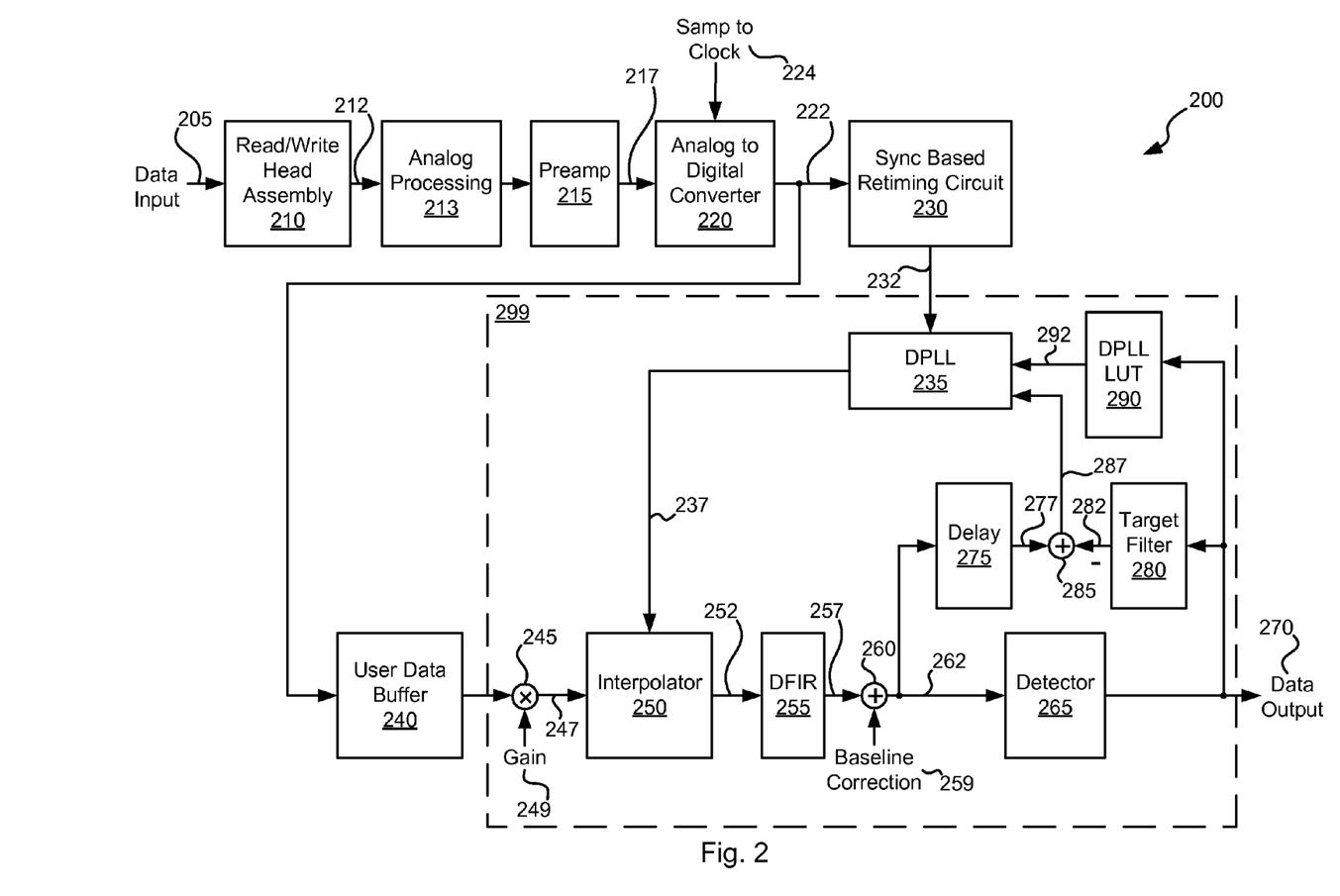
FIG. 2 is a block diagram of a circuit for processing enhanced user data synchronization patterns in accordance with some embodiments of the present invention.

Turning to FIG. 2, a block diagram of a data processing circuit 200 for processing enhanced user data synchronization patterns in accordance with some embodiments of the present invention. Among other things, data processing circuit 200 includes an error correction loop 299 that is initialized by initial phase and frequency offsets 232 calculated by a sync based retiming circuit 230. One embodiment of sync based retiming circuit 230 is discussed below in relation to FIG. 3. Data processing circuit 200 includes a read/write head assembly 210 that senses a magnetic field 205 stored on a storage medium (not shown) and converts the sensed information to an electrical signal 212. Electrical signal 212 is provided to an analog processing block 213 as is known in the art, and the output of analog processing block 213 is provided to a preamplifier 215 that amplifies the signal and provides a corresponding amplified signal 217. An analog to digital converter 220 receives amplified signal 217 and converts it to a series of digital samples 222 each corresponding to a time instant governed by a sample clock 224. Digital samples 222 are provided to a sync based retiming circuit 230 that operates to detect synchronization pattern 106 and synchronization pattern 110, and based thereon to calculate initial phase and frequency offsets 232 that are provided to a digital phase lock loop circuit 235.

In addition, digital samples 222 are stored to a user data buffer 240. User data buffer 240 may be any memory capable of storing and later providing access to digital samples 222. In some embodiments of the present invention, user data buffer 240 is a first-in/first-out memory as are known in the art. User data buffer 240 may be sized to allow storage of slightly more than the amount of data expected in the user data region up to the end of synchronization pattern 110. This allows for the processing of synchronization pattern 106 and synchronization pattern 110 before re-sampling or interpolation of the previously stored samples from the user data region starts. Serial data 222 is pulled from user data buffer 240 and provided to a multiplier circuit 245 that is part of error correction loop 299 where it is multiplied by a gain factor 249 to yield an output 247. Gain factor 249 is a variable gain correction that is applied to correct any gain error in the analog input circuit. Output 247 is provided to an interpolator circuit 250 that interpolates output 247 based upon a phase shift output 237 from digital phase lock loop circuit 235.

Interpolator circuit 250 provides an interpolated output 252 to a digital finite impulse response filter 255 that provides a filtered output 257. Digital finite impulse response filter 255 may be any digital finite impulse response filter known in the art. In some cases, digital finite impulse response filter 255 is an adaptive filter as are known in the art. A baseline correction value 259 is added to filtered output 257 by an adder circuit 260 to yield an output 262. Baseline correction value 259 is operable to remove any DC offset or perform any other needed baseline correction. Output 262 is provided to a detector circuit 265 that yields a data output 270. Detector circuit 265 may be any detector circuit known in the art including, but not limited to, a Viterbi algorithm detector or a low density parity check decoder as are known in the art. Data output 270 is provided to a target filter 280 that provides a target output 282, and to a digital phase lock loop look up table 290 that provides a table value 292. Target filter 280 may be any filter known in the art that is capable of conforming an input to a target. In some cases, target filter 280 is a three tap digital finite impulse response filter as are known in the art. Table value 292 is one of a number of values designed to adaptively adjust digital phase lock loop circuit 235 based upon the value of data output 270.

In addition, output 262 is provided to a delay circuit 275 that provides a delayed output 277. Delayed output 277 is output 262 delayed an amount corresponding to the time required to process output 262 through detector circuit 265 and target filter 280. Said another way, delayed output 277 and target output 182 are aligned in time by delay circuit 275. Target output 282 is subtracted from delayed output 277 using an adder circuit 285 to yield an error value 287. Error value 287 is provided to digital phase lock loop circuit 235 where it is used along with table value 292 to adjust phase shift output 237 that is provided to interpolator circuit 250. It should be noted that error correction loop 299 from output 247 to phase shift output 237, may be done with other error correction loops known in the art that are capable of receiving initial phase and frequency offsets 232, and beginning operation based upon the received offsets. In some cases, error correction loop 299 may be the same error correction loop operating in systems relying on a single synchronizing pattern.

In operation, data input 205 is sensed from a magnetic storage medium and processed into digital samples 222. Digital samples 222 are sequentially queried to identify synchronization pattern 106 and synchronization pattern 110. Once synchronization pattern 110 has been detected, an expected distance and an actual distance between the two is used to calculate initial phase and frequency offsets 232 as is more dully described below in relation to FIG. 3.

While awaiting detection of synchronization pattern 110, digital samples are stored in user data buffer 240. Once synchronization pattern 110 is received and initial phase and frequency offsets 232 are available, initial phase and frequency offsets 232 are provided to digital phase lock loop circuit 235. Initial phase and frequency offsets 232 may provide a phase and frequency offset to any bit within those stored in user data buffer 240 where processing is to begin. In some cases, this is the initial bit in the user data region from which synchronization pattern 106 and synchronization pattern 110 are derived. At this point, data samples representing the user data region are sequentially pulled from user data buffer 240, gain adjusted and interpolated by interpolator circuit 250. The interpolated data is processed through detector circuit 265. For each processed bit, error value 287 is generated and provided to digital phase lock loop circuit 235. Digital phase lock loop circuit 235 generates an updated phase offset for each bit. The updated phase offset is provided by digital phase lock loop circuit 235 to interpolator circuit 250 where it is used to interpolate the next data sample pulled from user data buffer 240. This process is repeated for each bit of user data 108 and where available, user data 112 is processed.

By using two synchronizing patterns (i.e., synchronizing pattern 106 and synchronizing pattern 110) to calculate the initial phase and frequency offsets, error correction loop 299 including digital phase lock loop circuit 235 is more able to accurately lock and track the phase and frequency of data samples pulled from user data buffer 240. In particular, use of a single synchronizing pattern allows for somewhat accurate determination of a phase offset corresponding to the data near the synchronizing pattern. However, the phase shift continues to change over the course of the user data due to frequency offset. Error correction loop 299 attempts to correct for the frequency offset by changing the interpolation performed by interpolator circuit 250 to account for the frequency offset and its effect on phase offset over time. Where the frequency offset is significant, the error correction loop 299 may not be able to recover with sufficient speed resulting in data errors. By using the second synchronization pattern, the initial frequency offset can be accurately calculated. This frequency offset can be used to correctly adjust not only the phase offset, but also the initial frequency allowing the error correction loop including the digital phase lock loop circuit to more quickly lock to the phase and frequency of the data.

Figure 3:
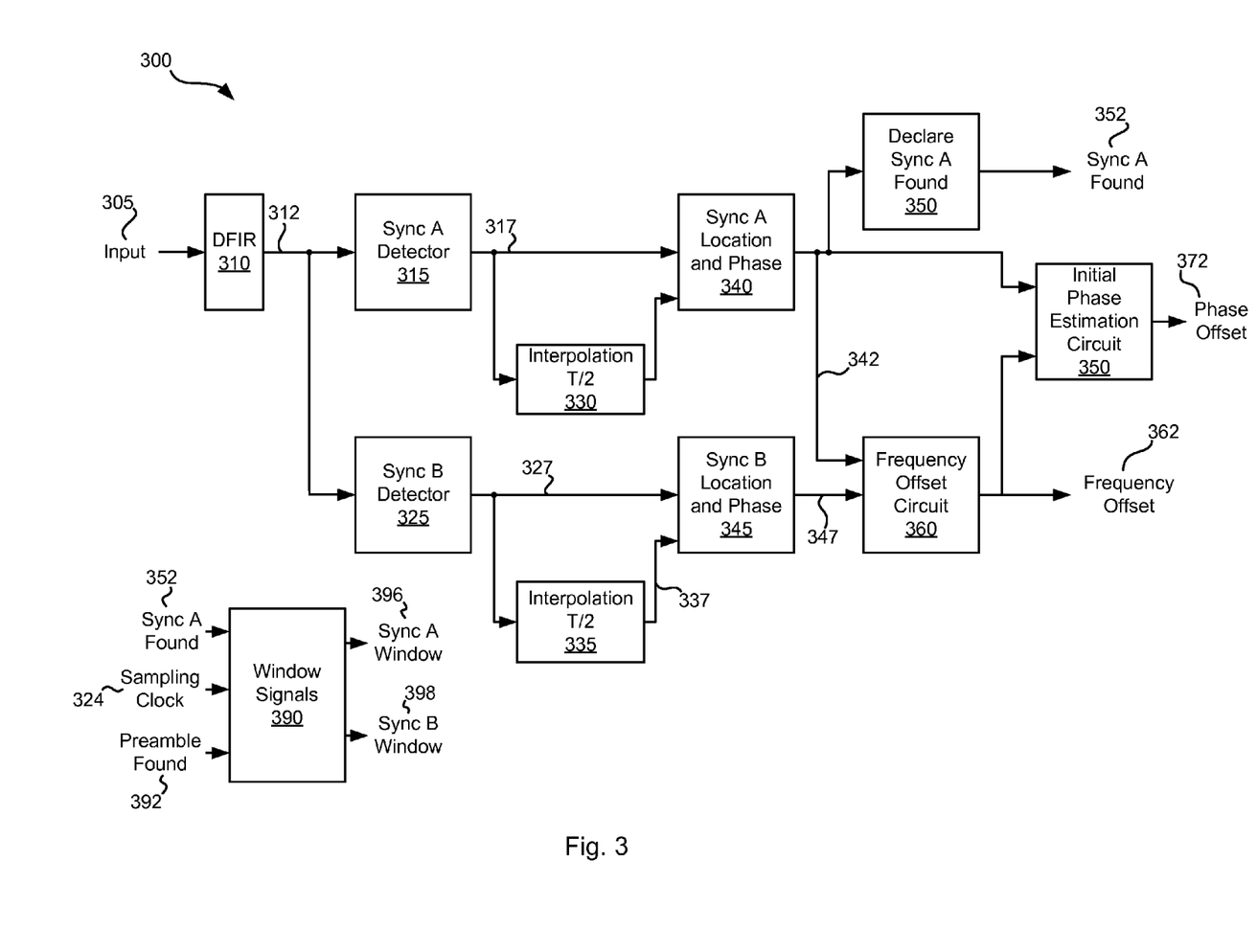
FIG. 3 is a block diagram of a system for processing user data synchronization patterns to yield a frequency offset and a phase offset in accordance with some embodiments of the present invention.

Turning to FIG. 3, a block diagram of a processing system 300 that processes user data synchronization patterns to yield a frequency offset and a phase offset in accordance with some embodiments of the present invention. Processing system 300 includes a digital finite impulse response filter 310 that receives a data input stream 305 and provides a filtered output 312. Digital finite impulse response filter 310 is a replica of digital finite impulse response filter 255, and uses adaptive taps that were derived for the prior sector. Digital finite impulse response filter 310 may be any digital finite response filter known in the art. Filtered output 312 is provided to both a sync A detector circuit 315 and a sync B detector circuit 325. Sync A detector circuit 315 compares the received input with a known pattern to determine whether it matches synchronization pattern 106. When synchronization pattern 106 is detected, a sync A found output 317 is asserted. In some cases, sync A detector circuit 315 only allows assertion of sync A found output 317 within a defined window (i.e., during assertion of a sync A window signal 396) where synchronization pattern 106 is expected to be found. For example, sync A detector circuit 315 may only assert sync A found output 317 within N and M bit periods of the end of servo data 104 as determined by a window signals circuit 390. Window signals circuit 390 may receive a sync A found signal 352, a preamble found signal 392 and a sampling clock 394. In this case, N may be the length of synchronization pattern 106 less a small number of bit periods and M may be the length of synchronization pattern 106 plus a small number of bit periods. By limiting the window in this way, false positives on sync A found output 317 may be reduced or eliminated. Similarly, sync B detector circuit 325 compares the received input with a known pattern to determine whether it matches synchronization pattern 110. When synchronization pattern 110 is detected, a sync B found output 327 is asserted. In some cases, sync B detector circuit 325 only allows assertion of sync B found output 327 within a defined window (i.e., during assertion of a sync B window signal 398) where synchronization pattern 110 is expected to be found. For example, sync B detector circuit 325 may only assert sync B found output 327 within X and Y bit periods after assertion of sync A found output 317. In this case, X may be the expected distance between synchronization pattern 106 and synchronization pattern 110 (i.e., the length of user data 108) less a small number of bit periods and Y may be the expected distance between synchronization pattern 106 and synchronization pattern 110 plus a small number of bit periods. By limiting the window in this way, false positives on sync B found output 327 may be reduced or eliminated.

Sync A found output 317 is provided directly to a sync A location and phase detection circuit 340, and to a T/2 interpolation circuit 330 that interpolates the sync A output 317 based on a half rate frequency and provides an interpolated output 332 to sync A location and phase detection circuit 340. Sync A location and phase detection circuit 340 compares the magnitude of sync A found output 317 and interpolated output 332. The input with the greatest magnitude is identified as being closest to the actual location of synchronization pattern 106, and this location is stored as the location of synchronization pattern 106. By using only sync A found output 317, the location can be found within T/2, however, by additionally using interpolated output 332, the location can be found within T/4. It should be noted that finer interpolation may be used to allow for a more accurate identification of the location of synchronization pattern 106. Sync A location and phase detection circuit 340 provides the location as a location output 342. Also, upon identification of synchronization pattern 106, a declare sync A found circuit 350 asserts a sync A found output 352.

Similarly, sync B found output 327 is provided directly to a sync B location and phase detection circuit 345, and to a T/2 interpolation circuit 335 that interpolates the sync B output 327 based on a half rate frequency and provides an interpolated output 337 to sync B location and phase detection circuit 345. Sync B location and phase detection circuit 345 compares the magnitude of sync B found output 327 and interpolated output 337. The input with the greatest magnitude is identified as being closest to the actual location of synchronization pattern 110, and this location is stored as the location of synchronization pattern 110. Again, by using only sync b found output 327, the location can be found within T/2, however, by additionally using interpolated output 337, the location can be found within T/4. It should be noted that finer interpolation may be used to allow for a more accurate identification of the location of synchronization pattern 110. Sync B location and phase detection circuit 345 provides the location as a location output 347. By picking maximum correlation locations for synchronization pattern 106 and synchronization pattern 110, the process is rendered largely insensitive to gain variations.

Location output 342 and location output 347 are provided to a frequency offset calculation circuit 360. Frequency offset calculation circuit 360 subtracts the value of location output 342 from the value of location output 347, and divides the result by the expected distance between synchronization pattern 106 and synchronization pattern 110 to yield a frequency offset 362. The following equation describes the process:

$$\text{Frequency Offset 362} = \frac{\text{Location Output 347} - \text{Location Output 342}}{\text{Expected Distance}} - 1.$$

As an example, where the difference between the location outputs is 257.1 and the expected distance is 256, the calculated frequency offset is 0.00429. This frequency offset causes the phase offset to change slightly for every sample of the user data that is taken.

Frequency offset 362 is provided to an initial phase offset estimation circuit 370 along with location output 342. Location output 342 provides the location of synchronization pattern 106 that is accurate to within T/4. Where frequency offset 362 is zero, sampling of user data 108 could be performed by simply adding 1T to each successive sample starting from location output 342. However, as mentioned, because frequency offset 362 is often non-zero, the accuracy of sampling decreases over time causing data errors due to an inability of the error correction loop to adjust for a significant initial phase offset and/or frequency offset. To correct this, frequency offset 362 is used by initial phase estimation circuit 370 to calculate an accurate phase offset 372 corresponding to the first sample of user data 108. The phase offset may be calculated in accordance with the following equation:

Phase Offset 372=Location Output 342−(BitPeriods) Frequency Offset 362, where Bit Periods is the number of bit periods between location output 342 and user data 108.

Figure 4:
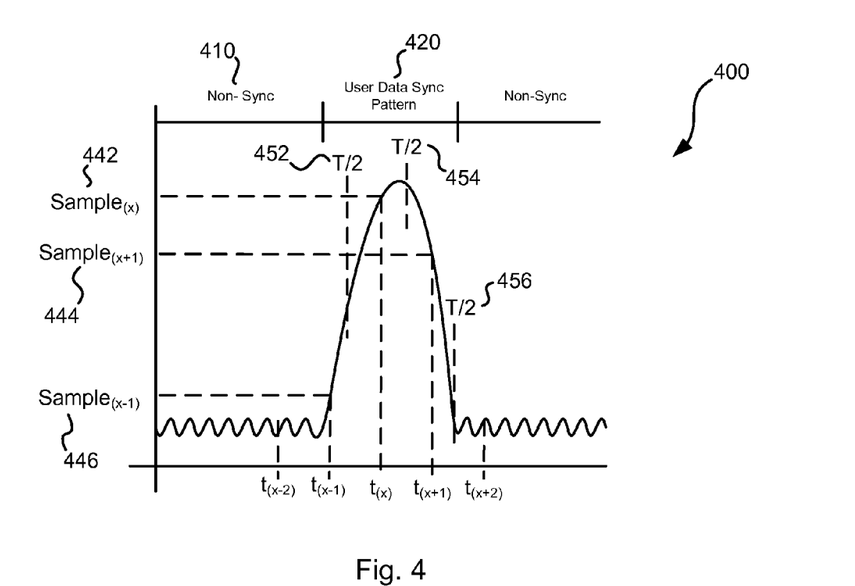
FIG. 4 is a timing diagram illustrating the process for determining sync pattern location that may be used in accordance with different embodiments of the present invention.

Turning to FIG. 4, a timing diagram 400 graphically depicts the process for determining the location of synchronization patterns 106, 110 that may be used in accordance with different embodiments of the present invention. In particular, in a period 410 before the pattern corresponding to a synchronization pattern is received, the signal level provided by either Sync A detector circuit 315 or sync B detector circuit 325 is relatively low. Once the synchronization pattern is detected during a user data sync pattern period 420 the signal level provided by either Sync A detector circuit 315 or sync B detector circuit 325 increases. During user data sync pattern period 420, either Sync A detector circuit 315 or sync B detector circuit 325 provides multiple levels corresponding to sample periods 442, 444, 446 as sync A output 317 or sync B output 327. The levels correspond to locations, t(x−1), t(x) and t(x+1), respectively. In addition, T/2 interpolation circuit 330 or T/2 interpolation circuit 335 interpolate T/2 locations 452, 454, 456 and provides levels corresponding to the sample locations as interpolated output 332 or interpolated output 337. In this case, the largest value corresponds to T/2 location 454. As such, the T/2 location 454 is identified as the location of the synchronization pattern being processed (i.e., half way between t(x) and t(x+1)). As should be appreciated, the process graphically depicted in FIG. 4 is repeated in Sync A detector circuit 315 for synchronization pattern 106 and in Sync B detector circuit 325 for synchronization pattern 110.

In some cases, a fine phase offset estimation is utilized. The estimation includes subtracting the value corresponding to the sample succeeding (i.e., the sample 1T later) the sample exhibiting the maximum value from the sample preceding (i.e., the sample 1T before). The difference is divided by two times the maximum value in accordance with the following equation:

$$\text{Phase Offset} = K \frac{\text{Preceding Sample} - \text{Succeeding Sample}}{2 * \text{Maximum Sample}}.$$

In this example, the preceding sample corresponds to T/2 location 452 and the succeeding sample corresponds to T/2 location 456, and the maximum sample corresponds to T/2 location 454. K is a normalizing scaling factor that depends on the target where the detector circuits (i.e., sync A detector circuit 315 and sync B detector circuit 325) are implemented to use target information to determine specific coefficients used within the sync detector circuits. The target information corresponds to the detection targets used in a data detector in the circuit (e.g., a Virterbi algorithm detector, or a low density parity check decoder). As an example, where the detector circuits are two tap target filters, a K value of 0.9994 may be used where the two taps are eight and fourteen, respectively.

Figure 5:
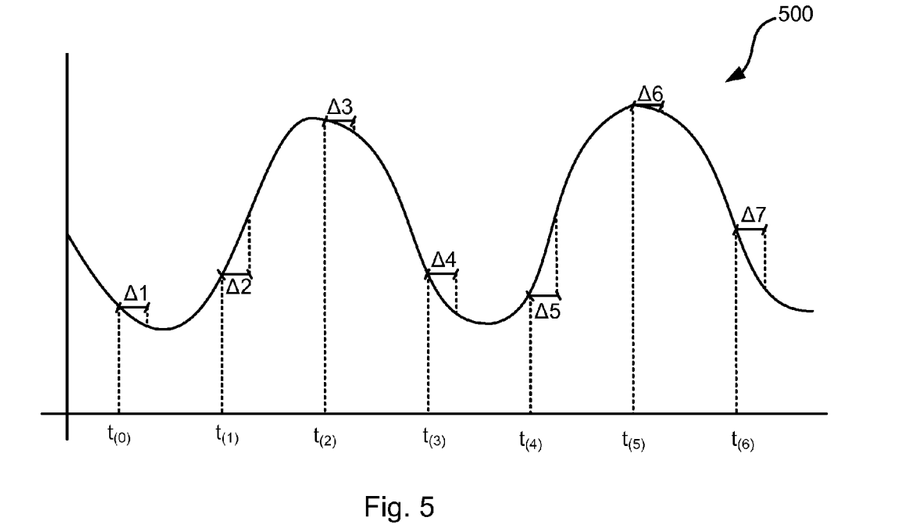
FIG. 5 is a timing diagram illustrating a process of interpolating buffered user data samples that may be used in accordance with some embodiments of the present invention.

Turning to FIG. 5, a timing diagram 500 illustrates a process of interpolating buffered user data samples that may be used in relation to different embodiments of the present invention. In particular, a number of data samples each corresponding to respective sample points (t(0), t(1), t(2), t(3), t(4), t(5) and t(6)) are shown. Each of the samples are interpolated by a delta value corresponding to the particular phase offset for that sample under the control of the error correction loop 299.

Figure 6:
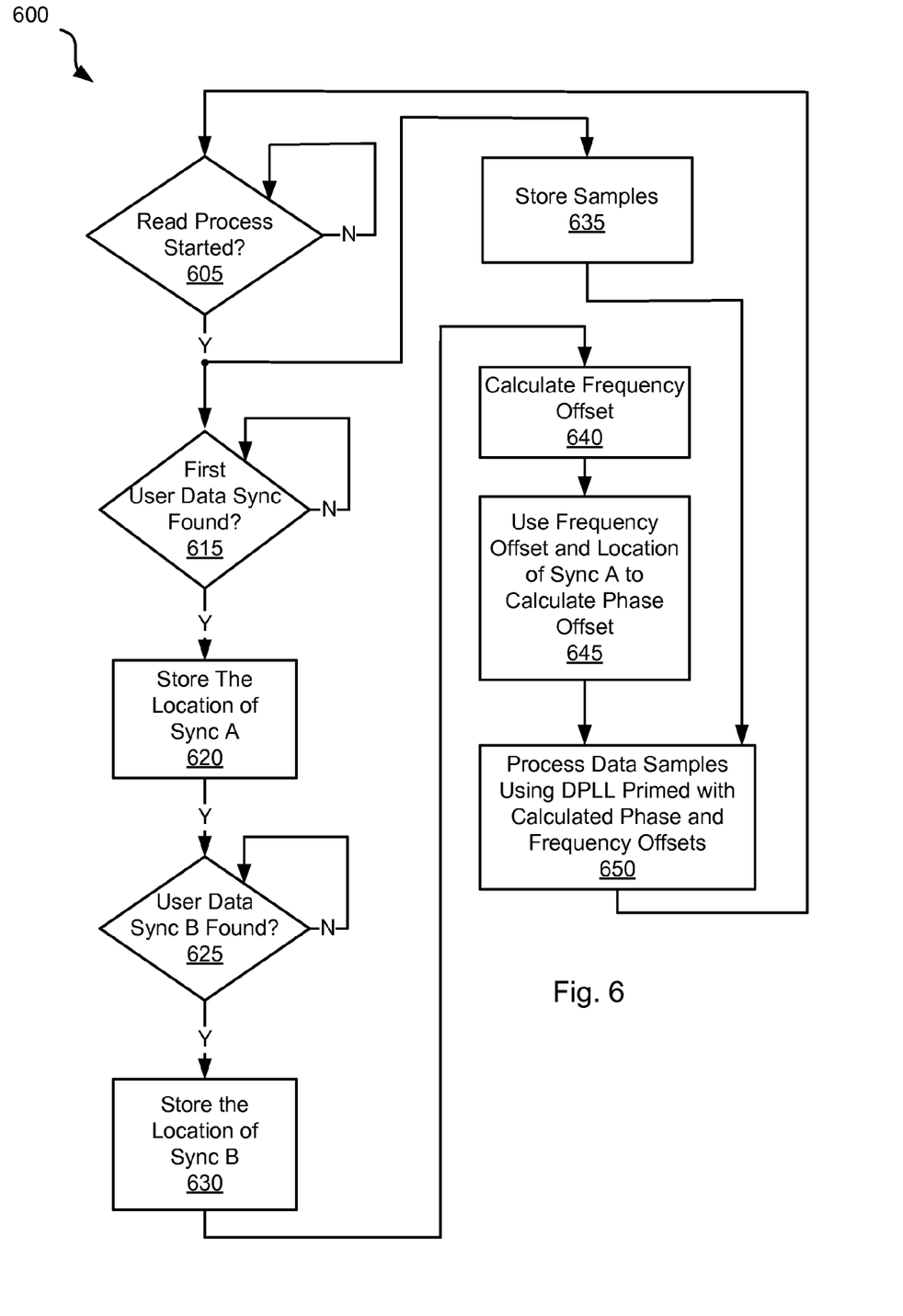
FIG. 6 is a flow diagram of a method in accordance with one or more embodiments of the present invention for processing user data synchronization patterns to yield a frequency offset and a phase offset in accordance with various embodiments of the present invention.

Turning to FIG. 6, a flow diagram 600 depicts a method in accordance with one or more embodiments of the present invention for processing user data synchronization patterns to yield a frequency offset and a phase offset in accordance with various embodiments of the present invention. Following flow diagram 600, a series of digital samples is received and continuously queried to determine if a new read process has started (block 605). In particular, it is determined whether a user data field is started in which synchronizing patterns are to be located. In some cases, toggling of a read gate signal indicates a change in user data fields. Where the read process has started (block 605), the input data stream is queried to determine whether a first user data sync (e.g., synchronization pattern 106) is found (block 615). At the same time that the input stream is being queried for the first data sync, the received data samples are stored to a user data buffer (block 635).

Once synchronization pattern 106 is detected (block 615), the location of the synchronization pattern is calculated and stored (block 620). This may be done using the approach graphically displayed in FIG. 4 above and described in relation to FIG. 3 above. Alternatively, the location may be determined using any other approach known in the art for identifying the location of a signal. Once synchronization pattern 106 is detected and its location stored (block 615 and block 620), the series of digital samples is queried for synchronization pattern 110 (block 625). Once synchronization pattern 110 is detected (block 625), the location of the synchronization pattern is calculated and stored (block 630). This may be done using the approach graphically displayed in FIG. 4 above and described in relation to FIG. 3 above.

With the locations of synchronization pattern 106 and synchronization pattern 110 established, a frequency offset is calculated (block 640). This frequency offset may be calculated in accordance with the following equation:

$$\text{Frequency Offset} = \frac{\text{Location of Pattern 110} - \text{Location of Pattern 106}}{\text{Expected Distance}} - 1.$$

The calculated frequency offset may then be used to calculate an initial phase offset (block 645). The phase offset may be calculated in accordance with the following equation:

Phase Offset=Location of Pattern 106−(BitPeriods) Frequency Offset, where Bit Periods is the number of bit periods between the location of pattern 110 and the location of pattern 106. The calculated phase offset and frequency offset values may then be used by an error correction loop to interpolate the earlier stored samples (block 650).

Figure 7:
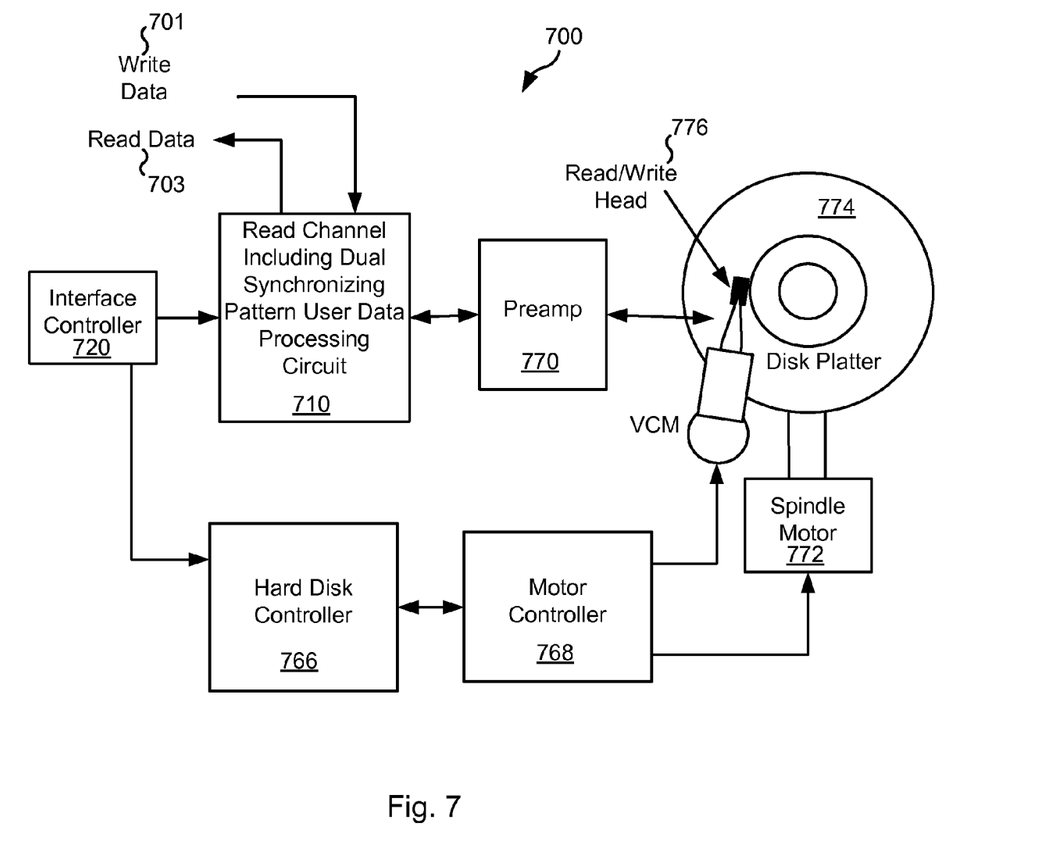
FIG. 7 depicts a storage system including a read channel with a dual synchronizing pattern user data processing circuit in accordance with various embodiments of the present invention.

Turning to FIG. 7, a storage system 700 including a read channel module 710 with a dual synchronizing pattern user data processing circuit is shown in accordance with various embodiments of the present invention. Storage system 700 may be, for example, a hard disk drive. Storage system 700 also includes a preamplifier 770, an interface controller 720, a hard disk controller 766, a motor controller 768, a spindle motor 772, a disk platter 774, and a read/write head 776 disposed in relation to the disk platter. Interface controller 720 controls addressing and timing of data to/from disk platter 774. The data on disk platter 774 consists of groups of magnetic signals that may be detected by read/write head assembly 776 when the assembly is properly positioned over disk platter 774. In one embodiment, disk platter 774 includes magnetic signals recorded in accordance with either a longitudinal or a perpendicular recording scheme, and including user data regions separated by servo data. The user data regions may include two synchronization patterns similar to that discussed above in relation to FIGS. 1*a*-1*b*.

In a typical read operation, read/write head assembly 776 is accurately positioned by motor controller 768 over a desired data track on disk platter 774. Motor controller 768 both positions read/write head assembly 776 in relation to disk platter 774 and drives spindle motor 772 by moving read/write head assembly to the proper data track on disk platter 774 under the direction of hard disk controller 766. Spindle motor 772 spins disk platter 774 at a determined spin rate (RPMs). Once read/write head assembly 774 is positioned adjacent the proper data track, magnetic signals representing data on disk platter 774 are sensed by read/write head assembly 776 as disk platter 774 is rotated by spindle motor 772. The sensed magnetic signals are provided as a continuous, minute analog signal representative of the magnetic data on disk platter 774. This minute analog signal is transferred from read/write head assembly 776 to read channel module 710 via preamplifier 770. Preamplifier 770 is operable to amplify the minute analog signals accessed from disk platter 774. In turn, read channel module 710 decodes and digitizes the received analog signal to recreate the information originally written to disk platter 774. This data is provided as read data 703 to a receiving circuit. As part of decoding the received information, read channel module 710 performs error correction based upon the location of the first synchronization pattern and the second synchronization pattern similar to that discussed above in relation to FIGS. 1-6. A write operation is substantially the opposite of the preceding read operation with write data 701 being provided to read channel module 710. This data is then encoded and written to disk platter 774.

In conclusion, the invention provides novel systems, devices, methods and arrangements for accessing a storage medium. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscribe line systems. Therefore, the above description should not be taken as limiting the scope of the invention, which is defined by the appended claims.

What is claimed is:

1. A bit density efficient system for accurately processing user data derived from a storage medium, the system comprising:
   a storage medium including a series of data, wherein the series of data includes a user data region, and wherein the user data region includes a first synchronization pattern and a second synchronization pattern located a distance from the first synchronization pattern;
   a storage buffer, wherein the storage buffer is operable to receive at least a portion of the series of data;
   a retiming circuit, wherein the retiming circuit is operable to calculate an initial phase offset and frequency offset for a defined bit within the storage buffer using a first location of the first synchronization pattern and a second location of the second synchronization pattern, and wherein the retiming circuit includes:
      a first location calculation circuit, wherein the first location calculation circuit is operable to determine a first location corresponding to the first synchronization pattern;
      a second location calculation circuit, wherein the second location calculation circuit is operable to determine a second location corresponding to the second synchronization pattern;
      a frequency offset calculation circuit, wherein the frequency offset calculation circuit is operable to calculate a frequency offset based at least in part on the first location and the second location; and
      an initial phase offset circuit, wherein the initial phase offset circuit is operable to calculate an initial phase offset based at least in part on the frequency offset; and
   an error correction loop circuit, wherein the error correction loop circuit is operable to re-sample the series of data from the storage buffer based at least in part on the initial phase offset and a frequency offset.

2. The system of claim 1, wherein calculating the frequency offset is done in accordance with the following equation:

$$\text{the frequency offset} = \frac{\text{the second location} - \text{the first location}}{\text{the distance}} - 1.$$

3. The system of claim 2, wherein calculating the initial phase offset is done in accordance with the following equation:

$$\text{the initial phase offset} = \text{the first location} - (\text{bit periods}) \text{ the frequency offset},$$

wherein the bit periods corresponds to the number of bit periods from the first location to which the initial phase offset corresponds.

4. The system of claim 1, wherein the first location calculation circuit comprises:
   a synchronization detector circuit, wherein the synchronization detector circuit is operable to detect the first synchronization pattern; and
   a location calculation circuit, wherein the location calculation circuit calculates a location of where the first synchronization pattern was detected by the synchronization detector circuit.

5. The system of claim 4, wherein the first location calculation circuit further comprises:
a T/2 interpolation circuit, wherein the T/2 interpolation circuit provides at least an additional point from which the location of where the first synchronization pattern was detected can be found.

6. The system of claim 5, wherein the location of where the first synchronization pattern was detected is within one quarter sampling period of the actual location of the first synchronization pattern.

7. The system of claim 1, wherein the retiming circuit comprises:
a window signal circuit, wherein the window signal circuit is operable to identify a first window during which the first synchronization pattern is expected within the series of data, and wherein the window signal circuit is operable to identify a second window during which the second synchronization pattern is expected within the series of data.

8. The system of claim 1, wherein the error correction loop circuit comprises:
a digital phase lock loop circuit, wherein the digital phase lock loop circuit receives the initial phase offset and the frequency offset, and provides a bit period by bit period updated phase shift output; and
an interpolator circuit, wherein the interpolator circuit interpolates the series of data accessed from the storage buffer.

9. The system of claim 8, wherein the series of data accessed from the storage buffer is multiplied by a gain correction factor prior to being interpolated by the interpolator circuit.

10. The system of claim 8, wherein the error correction loop circuit further comprises:
a data detector circuit, wherein a detection algorithm is applied to an output derived from the interpolator circuit to yield a data output, and wherein the bit period by bit period updated phase shift output provided by the digital phase lock loop circuit is based at least in part on the data output.

11. A method for processing user data derived from a storage medium, the method comprising:
providing a storage medium including a series of data, wherein the series of data includes a user data region, and wherein the user data region includes a first synchronization pattern and a second synchronization pattern located a distance from the first synchronization pattern;
sampling data from the storage medium and storing the resulting series of data samples to a storage buffer;
determining a first location of the first synchronization pattern;
determining a second location of the second synchronization pattern;
calculating a frequency offset and an initial phase offset based at least in part on the first location and the second location, wherein calculating the frequency offset is done in accordance with the following equation:

$$\text{the frequency offset} = \frac{\text{the second location} - \text{the first location}}{\text{the distance}} - 1; \text{ and}$$

interpolating at least a portion of the series of data from the storage buffer based at least in part on the frequency offset and the initial phase offset.

12. The method of claim 11, wherein determining the first location of the first synchronization pattern includes:
detecting the first synchronization pattern in the series of data and asserting a first synchronization pattern found signal; and
determining a number of bit periods from a defined point until assertion of the first synchronization pattern found signal.

13. The method of claim 11, wherein the data is sampled at a period T to yield T samples, and wherein determining the first location of the first synchronization pattern further includes:
interpolating the series of data using a T/2 interpolator circuit to yield T/2 samples;
determining which of a T sample or T/2 sample exhibits a maximum within a first synchronization pattern window; and
assigning a location of the determined T sample or T/2 sample as the first location.

14. The method of claim 13, wherein determining the second location of the second synchronization pattern includes:
detecting the second synchronization pattern in the series of data and asserting a second synchronization pattern found signal;
determining a number of bit periods from the defined point until assertion of the second synchronization pattern found signal.

15. The method of claim 14, wherein determining the second location of the second synchronization pattern further includes:
interpolating the series of data using a T/2 interpolator circuit to yield T/2 samples;
determining which of a T sample or T/2 sample exhibits a maximum within a second synchronization pattern window; and
assigning a location of the determined T sample or T/2 sample as the second location.

16. The method of claim 11, wherein calculating the initial phase offset is done in accordance with the following equation:

$$\text{the initial phase offset} = \text{the first location} - (\text{bit periods}) \text{ the frequency offset,}$$

wherein the bit periods corresponds to the number of bit periods from the first location to which the initial phase offset corresponds.

17. The method of claim 16, wherein the bit periods correspond to a number of bit periods between the beginning of the user data region and the first location.

18. A storage system, the storage system comprising:
a storage medium including a series of data, wherein the series of data includes a user data region, and wherein the user data region includes a first synchronization pattern and a second synchronization pattern located a distance from the first synchronization pattern;
a read/write head assembly disposed in relation to the storage medium;
a read channel circuit, wherein the read channel circuit is operable to receive an analog input derived from the read/write head assembly that corresponds to the series of data, and wherein the read channel circuit includes:
a storage buffer, wherein the storage buffer is operable to receive at least a portion of the series of data;
a retiming circuit, wherein the retiming circuit is operable to calculate an initial phase and frequency offset for a defined bit within the storage buffer using a first location of the first synchronization pattern and a second location of the second synchronization pattern, and wherein the retiming circuit includes:

a first location calculation circuit, wherein the first location calculation circuit is operable to determine a first location corresponding to the first synchronization pattern;

a second location calculation circuit, wherein the second location calculation circuit is operable to determine a second location corresponding to the second synchronization pattern;

a frequency offset calculation circuit, wherein the frequency offset calculation circuit is operable to calculate a frequency offset based at least in part on the first location and the second location; and an initial phase offset circuit, wherein the initial phase offset circuit is operable to calculate an initial phase offset based at least in part on the frequency offset; and an error correction loop circuit, wherein the error correction loop circuit is operable to interpolate the series of data from the storage buffer based at least in part on the initial phase offset and a frequency offset.

19. The storage system of claim 18, wherein the first location calculation circuit comprises:

a synchronization detector circuit, wherein the synchronization detector circuit is operable to detect the first synchronization pattern; and a location calculation circuit, wherein the location calculation circuit calculates a location of where the first synchronization pattern was detected by the synchronization detector circuit.

20. The storage system of claim 19, wherein the first location calculation circuit further comprises:

a T/2 interpolation circuit, wherein the T/2 interpolation circuit provides at least an additional point from which the location of where the first synchronization pattern was detected can be found.

* * * * *